United States Patent [19]

Barnes

[11] Patent Number: 4,512,196
[45] Date of Patent: Apr. 23, 1985

[54] ULTRASOUND IMAGING WITH FM DETECTION

[75] Inventor: Casper W. Barnes, Newport Beach, Calif.

[73] Assignee: North American Philips Corporation, New York, N.Y.

[21] Appl. No.: 538,021

[22] Filed: Sep. 30, 1983

[51] Int. Cl.³ .............................................. G01N 29/00
[52] U.S. Cl. ......................................... 73/620; 73/606; 73/633; 73/642; 128/660
[58] Field of Search ............................ 73/642, 618–619, 73/620, 633, 596, 606; 128/660

[56] References Cited

U.S. PATENT DOCUMENTS

| | | | |
|---|---|---|---|
| 4,138,895 | 2/1979 | Mezrich | 73/642 |
| 4,227,417 | 10/1980 | Glenn | 73/625 |
| 4,316,390 | 2/1982 | Kretz | 73/620 |

*Primary Examiner*—Howard A. Birmiel
*Attorney, Agent, or Firm*—Jack E. Haken

[57] ABSTRACT

An ultrasound transducer having an annular acoustic aperture is utilized in combination with an echo-ultrasound imaging system having an FM detector. The off-axis transfer function characteristics of the annular transducer substantially improve the lateral resolution of the imaging system as compared with prior art systems which utilized round or rectangular transducer apertures.

3 Claims, 5 Drawing Figures

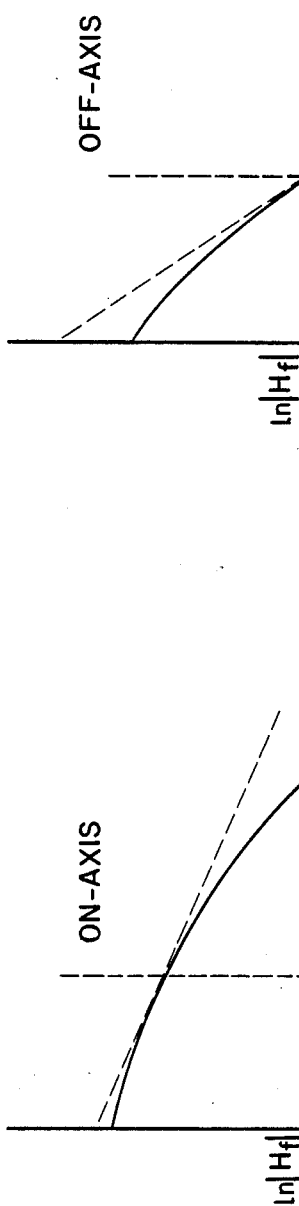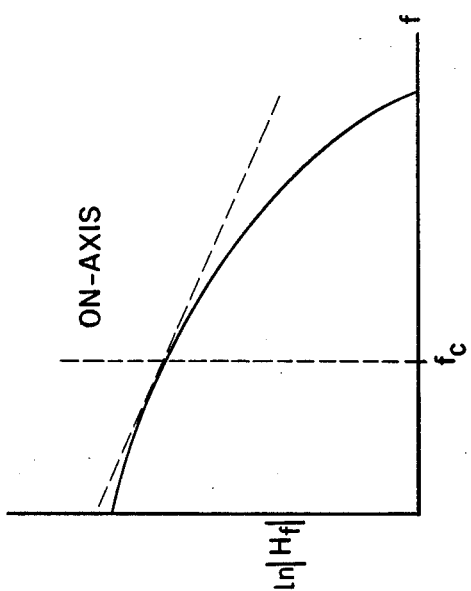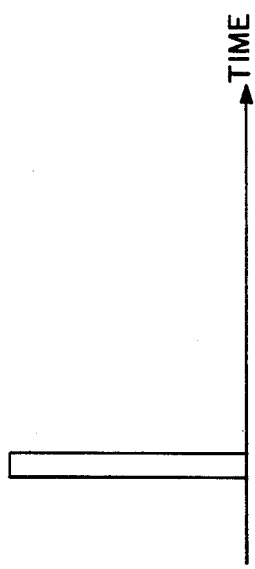

ULTRASOUND IMAGING WITH FM DETECTION

The invention relates to apparatus which utilizes ultrasound pulse echo techniques to image the internal structures of a body. More specifically, the invention relates to apparatus for improving the lateral resolution of an ultrasound pulse echo system which utilizes an FM detector.

BACKGROUND OF THE INVENTION

Ultrasound pulse echo imaging has become an important modality for medical diagnosis. Pulses of ultrasound energy are produced in a transducer and directed into a body. The energy is scattered from organ boundaries and other impedance discontinuities within the body; generating echos which are detected with a transducer (which may be the same transducer used for transmission) to produce electrical signals which are then processed to form an image of the internal body structures. Most ultrasound pulse echo imaging systems of the prior art generate images from information which is extracted from the AM envelope of echo signals received by the transducer. Such systems usually make use of a peak detector to extract a video signal from the returned echos and generate a display by modulating the intensity of each pixel as a function of the amplitude of a corresponding portion of video signal. Regions of the body which return strong echos (for example organ boundaries) will thus be depicted as bright areas in the image whereas regions which return low amplitude echos (for example homogenous regions within the liver) will be depicted as darker areas in the displayed image). Such apparatus is more completely described, for example, in *Medical Ultrasound Imaging: An Overview of Principles and Instrumentation*, J. F. Havlice and J. C. Taenzer; Proceedings of the IEEE, Volume 67, No. 4, April 1979, pages 620–640, which is incorporated herein, by reference, as background material.

More recently, Dr. Leonard Ferrari has described a technique for producing an image by utilizing information contained in the FM envelope of an ultrasound pulse echo signal. (Dr. Ferrari's U.S. patent application for "Ultrasonic Acoustic Imaging Apparatus", Ser. No. 384,533, filed on June 3, 1982 and assigned to The Regents of The University of California is incorporated herein by reference as background material.) This technique maps the instantaneous phase or frequency of the returned pulse echo signal into intensity levels in the displayed image. For example, regions of the body which return higher instantaneous frequencies may be displayed as bright areas and regions of the body which return lower frequencies may be displayed as darker areas in the image. The intensity of regions in the image will normally be independent of the amplitude of the returned signal. A squelch circuit may be provided which turns off the FM detector and displays a neutral intensity level in the event that the returned signal is too low for FM detection.

In B-scan imaging an ultrasound transducer is translated and/or angulated along the surface of a body undergoing examination. A two-dimensional image is generated by plotting the detected characteristic of a returned echo at an image point which corresponds to the coordinates of the scatterer which produced the echo. The depth coordinate of the scatterer is determined by measuring the time delay between pulse transmission and the receipt of the echo signal and the lateral coordinate of the scatterer is determined by measuring the lateral position and/or angulation of the transducer. Depth resolution in the image is primarily determined by the transfer function of the ultrasound receiver and detector. Lateral resolution in the image is determined by the lateral dimensions of the beam of ultrasound energy which is projected into the body which, in turn, is determined by the dimensions and focusing properties of the transducer.

SUMMARY OF THE INVENTION

In FM imaging systems, lateral resolution is primarily determined by the manner in which the instantaneous frequency of the pulse echo drops off as a point scatterer is moved laterally off the axis of the acoustic beam. High lateral resolution is obtained if the instantaneous frequency drops off rapidly as the scatterer moves off the axis. Lateral resolution is, therefore, determined by the radiation pattern of the transducer which in turn is determined by the geometry of the radiating transducer aperture. Transducers which are designed for conventional amplitude modulation images may not be optimal for FM imaging.

The frequency profile of ultrasound radiation from a transducer is determined by the magnitude of the round-trip transfer function, H(f), from the transducer to the point scatterer and back again to the transducer. This transfer function has the typical form shown in FIG. 1 for point scatterers located on the transducer acoustic axis and has the form shown in FIG. 2 for point scatterers which are located off of the transducer acoustic axis. The amount of frequency shift in the instantaneous frequency of the pulse echo from a point scatterer is proportional to the slope of the ln |H(f)| versus frequency curve at the center frequency of the transducer. As indicated in the figures, the instantaneous frequency of the pulse echo is shifted downward as a point scatterer is moved off axis. Highest lateral resolution in FM imaging is obtained with a transducer for which the magnitude of the slope of |H(f)| increases rapidly as a point scatterer moves off of the acoustic axis.

I have determined that high lateral resolution may be obtained in an FM ultrasound pulse imaging system by using an annular transducer aperture in place of the circular or rectangular transducer apertures which are typically used in prior art AM imaging systems. For a point scatterer on the acoustic axis, the round-trip impulse response of the aperture is very narrow and sharp and hence has a wide bandwidth transfer function with a low slope at the center frequency of the transducer. As a point scatterer moves off-axis, the impulse response very rapidly becomes low and broad with a narrow bandwidth which results in a high slope at the transducer center frequency.

In addition to the improvement in lateral resolution which is achieved in FM imaging, the annular transducer has the additional advantage of having a large depth-of-focus.

It is, therefore, an object of this invention to provide a system for FM pulse-echo imaging having high lateral resolution.

A further object of this invention is to provide a transducer for a pulse-echo imaging system which has a large depth-of-focus.

DESCRIPTION OF THE DRAWINGS

The specification and claims are to be read in connection with the accompanying drawings in which:

FIG. 1 illustrates the round trip transfer function H(f) of a typical transducer system with an on-axis point scatterer;

FIG. 2 illustrates the round trip transfer function of a typical transducer with an off-axis point scatterer;

FIG. 4 illustrates the on-axis impulse response of an annular transducer of the present invention; and FIG. 5 illustrates the off-axis impulse response of the annular transducer of the present invention.

DESCRIPTION OF A PREFERRED EMBODIMENT

Figure 3:
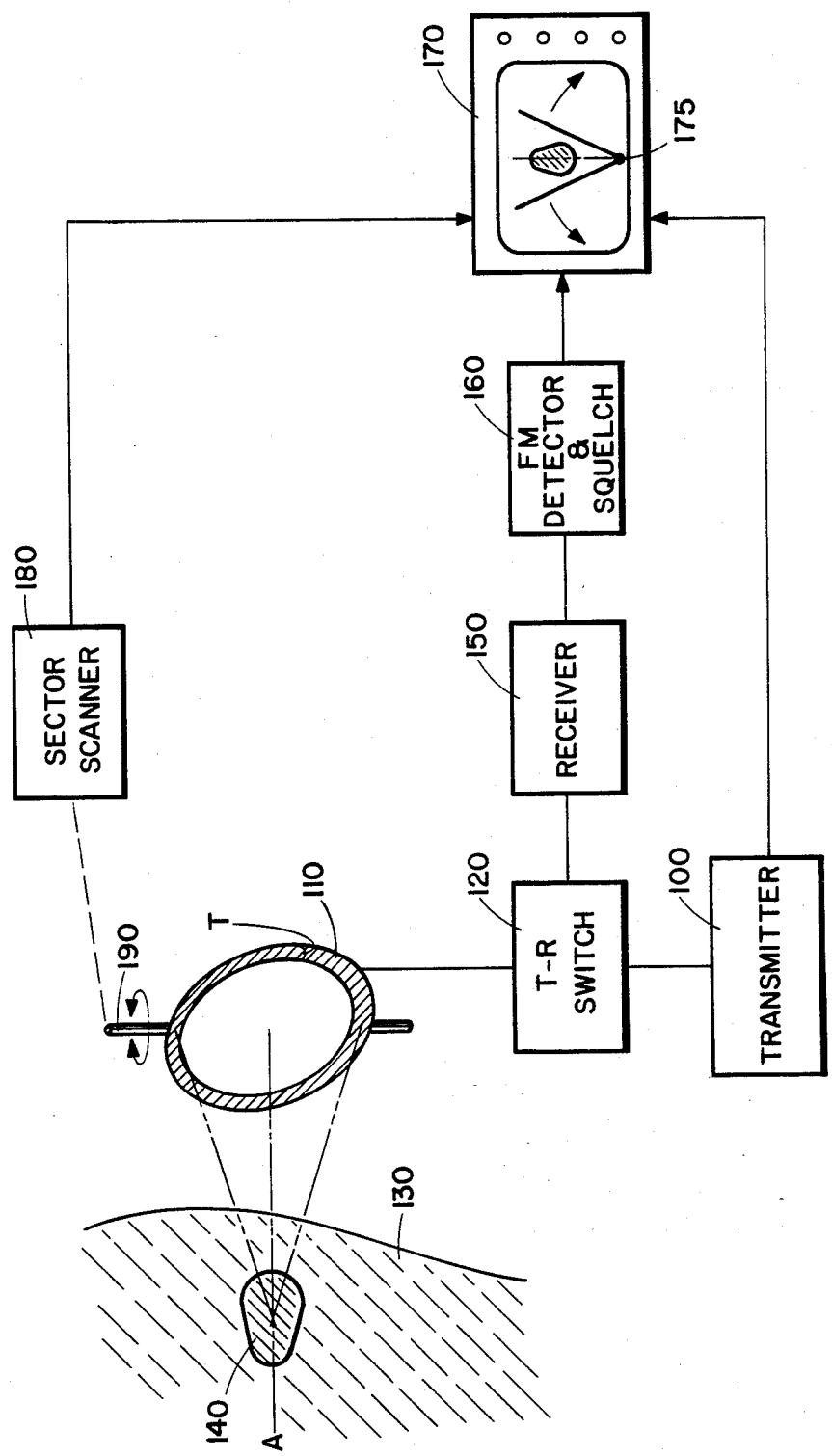
FIG. 3 is a block diagram of an FM imaging system of the present invention.

FIG. 3 illustrates a preferred embodiment of the invention. A transmitter 100 produces a stream of periodic electrical pulses which energize a transducer 110 via a T-R switch 120. The transducer converts the electrical pulses into pulses of ultrasound energy which are projected along the acoustic axis A of the transducer into a body undergoing examination 130. The ultrasound energy is scattered from impedance discontinuities within the body, for example organ boundaries 140, and portions of the energy are returned, in the form of echos, to the transducer 110 where they are converted into electrical signals and transmitted, via the T-R switch 120, to a receiver 150. The receiver amplifies and processes the echo signals and delivers then to an FM detector and squelch circuit 160. The FM detector 160 produces an output signal having an amplitude which is proportional to the instantaneous frequency of the echo pulse signals produced by the transducer 110. The squelch circuit assures that the FM detector produces a zero level output if the amplitude of the echo signals falls below a predetermined threshold. The output of the FM detector and squelch circuit 160 is applied to modulate the intensity of a display 170, typically a CRT display, so that the intensity of a selected pixel in the display is proportional to the instantaneous frequency of echo signals which are returned from a point in the body 130 whose coordinates are mapped to correspond with the position of the pixel in the display. Typically echos having an instantaneous frequency which correspond to a nominal center frequency will be displayed as neutral gray (zero), while echo signals having a lower instantaneous frequency may be displayed as darker shades and echos having a higher instantaneous frequency may be displayed as lighter shades.

The acoustic axis of the transducer 110 is scanned across the body 130, for example by a sector scanner motor 180, which causes the transducer to oscillate in a plane perpendicular to its acoustic axis by rotating the transducer on a shaft 190. The motion of the transducer is coupled to the sweep of the display in a conventional manner so that the sweep lines on the CRT are produced at an angle with respect to an apex 175, which corresponds to the angle of rotation of the shaft 190. The sweep of the display is further synchronized with the pulse train produced by transmitter 100 so that returned echos are displayed as pixels which are displaced from the apex 175 along the sweep lines at a distance which corresponds to the time interval between the transmitted pulse and the detection time of the returned echo and thus corresponds to the distance between the associated scatterer 140 and the transducer 110. With the exception of the transducer 110 (as set forth below), the system of FIG. 3 is generally constructed in accordance with the prior art teachings of Dr. Leonard Ferrari (cited above).

Prior art transducers for medical diagnostic applications were generally constructed with circular or rectangular apertures. Annular transducer apertures are known in the prior art, but are generally unacceptable for use in pulse-echo systems with AM detectors because they have radiation patterns with large side lobes. The side lobes produce unacceptable interference and distortion in a displayed image.

I have determined that a transducer with an annular aperture may be advantageously combined with a pulse-echo system having an FM detector and that the resultant combination has a substantially sharper lateral resolution than does a corresponding pulse echo system with an FM detector and a circular or rectangular transducer. The round trip impulse response of an annular transducer aperture is very narrow and sharp for a point scatterer which is located on the transducer axis A (FIG. 4) and the transducer thus has a wide band width transfer function with a low slope at the center frequency of the transducer. As the point scatterer moves off the transducer axis, the impulse response of the annular aperture very rapidly becomes low and broad, as illustrated in FIG. 5. As a result, the bandwidth of the transfer function narrows, and has a high slope at the transducer center frequency.

The annular transducer has the additional desirable effect of having a large depth of focus. The depth of focus is inversely related to the thickness T (FIG. 3) of the annulus. An infinitely thin annulus is in focus at all ranges, since all points on the transducer aperture are then approximately equidistant from any given point on the acoustic axis.

The lateral resolution of the present invention is further improved by the well known "capture effect" characteristic of FM detectors which result in the suppression of weaker signals in favor of the strongest signal presented to the detector. The capture effect effectively suppresses distortion which would otherwise be produced by the side lobe signals and produces a display which is determined primarily by the main lobe of the transducer.

What is claimed:

1. An ultrasound imaging system comprising, in combination:
    an ultrasound transducer having an annular acoustic aperture;
    means which excite the transducer to emit pulses of ultrasound energy and which produce electrical echo signals representative of echos of said pulses which are received by the transducer;
    FM detector means connected to receive the echo signals and to produce therefrom a detector output signal having an instantaneous amplitude which is proportional to the instantaneous frequency of the echo signals; and
    display means which produce an image by generating pixels whose brightness is a function of the detector output signal at points in an image which are mapped to correspond with the points of origin of the corresponding ultrasound echos.

2. The system of claim 1 further comprising squelch circuit means which suppress the FM detector output signal whenever the amplitude of the echo signal is less than a predetermined threshold amplitude.

3. The system of claim 1 further comprising means for rotating the transducer around an axis to generate a sector scan of emitted pulses and means for sychronizing the coordinates of displayed pixels with the rotation of the transducer.

* * * * *